T. M. SMITH.
AUTOMOBILE SIGNALING DEVICE.
APPLICATION FILED MAR. 25, 1919.
1,370,674.
Patented Mar. 8, 1921.
2 SHEETS—SHEET 1.
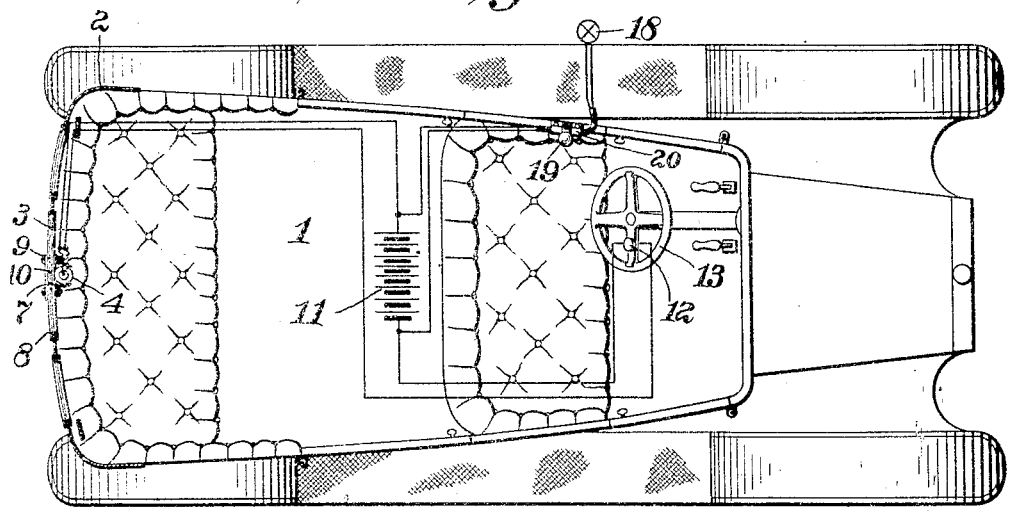
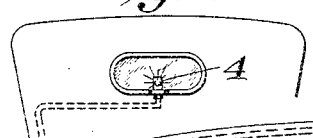
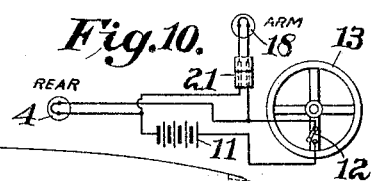
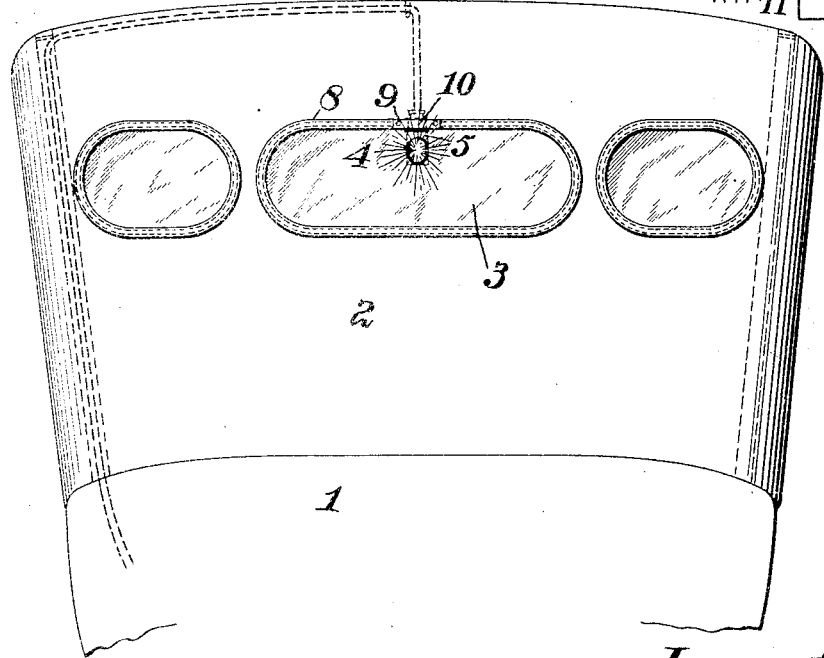
Inventor:
Thomas Marshall Smith,
by Spear, Middleton, Donaldson & Spear
Attys

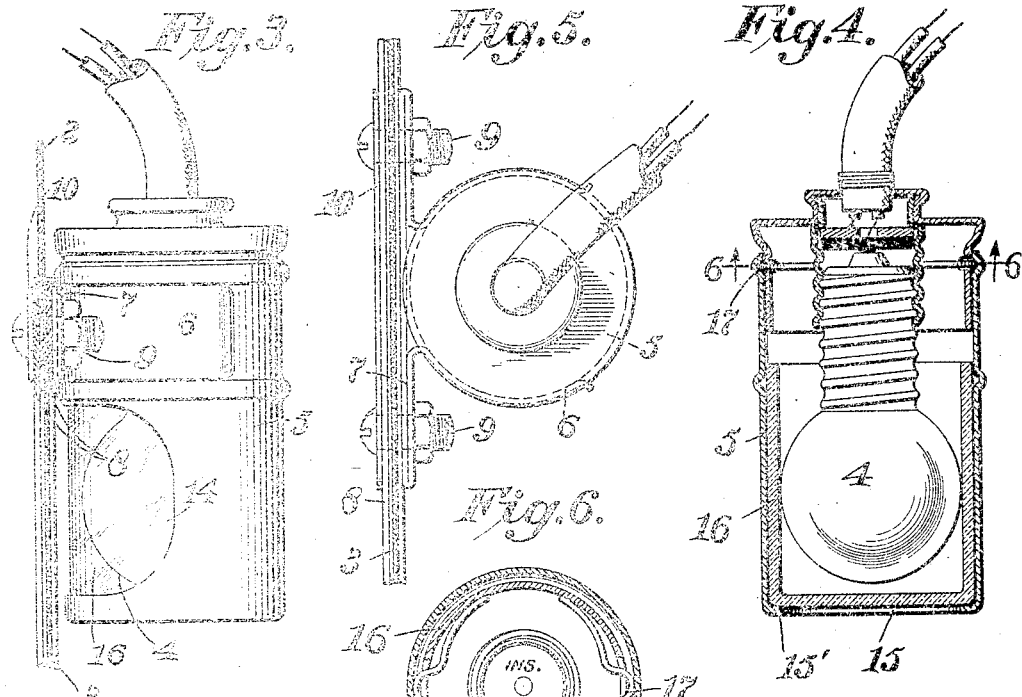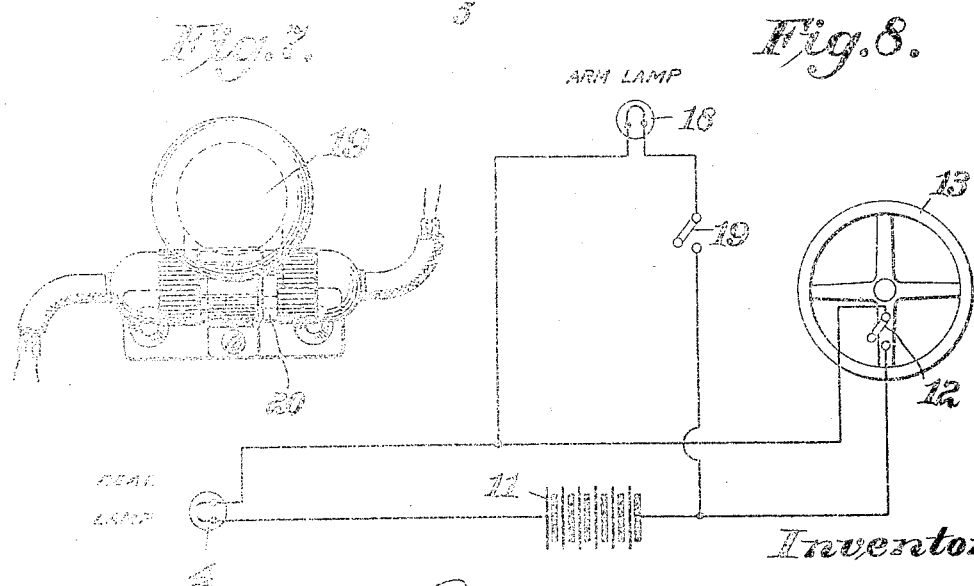

UNITED STATES PATENT OFFICE.

THOMAS MARSHALL SMITH, OF BALTIMORE, MARYLAND.

AUTOMOBILE SIGNALING DEVICE.

1,370,874.  Specification of Letters Patent.  Patented Mar. 8, 1921.

Application filed March 25, 1919. Serial No. 284,930.

*To all whom it may concern:*

Be it known that I, THOMAS MARSHALL SMITH, a citizen of the United States, and resident of Baltimore, Maryland, have invented certain new and useful Improvements in Automobile Signaling Devices, of which the following is a specification.

My invention provides a signal light for an automobile which will be readily visible to persons at the rear or to drivers and occupants of following vehicles and further will be within the range of observation of the occupants of the car on which the signal is mounted, so that if any failure of the signal occurs it will be noticed at once and precautions and corrections made immediately.

The invention consists in the features and combination and arrangement of parts hereinafter described and particularly pointed out in the claim.

In the accompanying drawings,

Figure 1 is a diagrammatic plan view of an automobile with my signaling system mounted thereon.

Fig. 2 is a rear view of the upper part of a car body and its top with the signal arranged at the rear window and near the upper edge thereof.

Fig. 3 is a detail view of the signal lamp and a portion of the top cover of the car to which it is attached.

Fig. 4 is a sectional view of the lamp.

Fig. 5 is a plan view of the parts shown in Fig. 3.

Fig. 6 is a sectional plan view of a part of the lamp.

Fig. 7 is a plan view of the contact button and associated parts controlling a signal lamp mounted on the arm of the driver.

Fig. 8 is a diagram of wiring by which the automobile tail light and the signal lamp on the driver's arm may be lighted simultaneously.

Fig. 9 is a view of a modification in which the lamp is arranged at the lower part of the window.

Fig. 10 is a diagram showing a lamp to be carried by the driver's arm and detachably connected with the rest of the system.

In these drawings 1 is the body and 2 the top of the automobile, the latter having the rear window 3. On the inside of the top and preferably at the top of the rear window a signal lamp 4 is mounted consisting of an incandescent electric bulb within a metallic casing 5, this casing being mounted on the spring clip 6, which is carried by or formed with a plate 7 held to the frame or seam 8 of the window by bolts 9 passing through the said frame or reinforced edge of the window, there being a stay plate or strip 10 on the outer side of the window frame to stiffen the parts. This lamp is in circuit with a battery 11 supported at any convenient place on the car, which circuit also includes a circuit closing device 12 at the steering wheel 13, so that the driver can make the signal at will by closing the circuit at 12, the red light showing through the window and being clearly visible from the rear.

A small electric bulb will suffice and the window may be of such material as will act to diffuse the light and increase its visibility. Being located high upon the car at or a little above the line of vision of occupants in a following car or vehicle the signal readily will be observed.

Further it can be seen by the driver or occupants of the car as well as by the persons in the rear or in a following vehicle and it can be ascertained at a glance by the persons on the car whether or not the signal is functioning.

In going over a hill-top or crest of a rise in the road the signal light can be observed for a longer period than if the lamp were located near the bottom part of the car. The window at the rear of the top is usually made with a reinforcement or frame about it made of several thicknesses of material, and thus affords a good support for the signal lamp where additionally reinforced by the outer stay piece and the base of the bracket or clip with the through bolts holding all the parts clamped together.

The lamp is removable from its bracket or clip so that it may be taken away when the top is folded if this is desired.

The outer casing of the lamp has an opening 14 facing rearwardly so that the light will be directed through the window from the inside of the top outwardly and as the casing of the lamp is of cylindrical form and of metal it will act as a reflector. The casing is also open at its lower end as at 15, Fig. 4, so as to shed some light downwardly and thus enable the occupants of the car to see if the light is burning properly. The electric bulb is inclosed within a glass member 16, which is held within the casing by an inturned flange at 15', this glass may be red in color or any other color. The top of the lamp is removable and is held to the body by a spring clip 17. In addition to the signal at the rear of the car held by the top thereof to be displayed through the window I provide an arm light shown diagrammatically at 18, which as in Letters Patent of the United States granted to me Nos. 1,209,059, December 19th, 1916; 1,248,188, November 27th, 1917, and 1,253,104, January 8th, 1918, is adapted to be secured to the sleeve or gauntlet of the driver and to be lighted when the driver throws his arm laterally of the car for signaling, this act bringing his arm against a circuit closing button 19 arranged adjacent the seat, so that the circuit from the battery will be closed to light the lamp while the operator is waving his arm to make the signal. The circuit closing button is shown in Fig. 7 and it is associated with a detachable electrical connection indicated at 20, whereby the operator on leaving the car may detach the arm light from the battery connection and maintain the arm light in connection with his sleeve or gauntlet. The arm lamp may be of the same general construction as that shown in Figs. 3, 4 and 6.
In Fig. 8 I show circuit wiring whereby the rear lamp mounted on the top of the automobile and the arm lamp may be lighted simultaneously when the circuit closing button at 19° is pressed so that the occupants of a following car may observe both the tail light and the signal given by the arm light, or if the driver closes the circuit at the steering wheel only the tail light will be operated. The two lamps are in series when the circuit is closed at 19, but when the switch 19 is open and the circuit is closed at the wheel, only the rear lamp is lighted. The operator thus has the choice of making a double signal, for instance in turning, by lighting both lamps or when stopping he may use only the tail lamp.

As above stated the end of the lamp is open. The bottom of the glass cup covering this opening may be left white or clear, so as to shed light downwardly into the car, while the red part of the glass cup sheds the red signal to the rear. When the lamp is carried by the driver's arm the light may shed its rays forwardly upon the operator's hand and he can use this light for reading or making repairs.

As shown in Fig. 9 the lamp may be arranged at the bottom of the rear window and project upwardly from the frame thereof and a suitable reflector may be employed. The wiring for this may be carried along the top edge of the rear seat and thence upwardly.

As shown in Fig. 10 the arm light and certain of the immediate circuit wires may be detached from the main wiring leading to the rear lamp. The detachable connection is made by an ordinary plug coupling. When in place it will be lighted each time the rear light is lighted from the circuit closer at the wheel, but its detachment will not interfere with the rear light.

What I claim is:

In combination with an automobile and its top having a rear window, a signal tail lamp for displaying a signal rearwardly from the automobile, said tail lamp being located adjacent the said rear window to shed its light therethrough and shedding light in a reduced measure within the automobile to indicate that it is working properly, and means for flashing said signal tail lamp, said means being controlled by the driver of the automobile from his seat substantially as described.

In testimony whereof I affix my signature

THOMAS MARSHALL SMITH.